United States Patent
Kowalyshyn

(10) Patent No.: US 10,334,444 B1
(45) Date of Patent: Jun. 25, 2019

(54) AUTOMATICALLY SWITCHING TO A BARRICADE MODE TO SECURE MOBILE COMPUTING DEVICES IN RESPONSE TO PREDETERMINED MOBILE COMPUTING DEVICE EVENTS

(71) Applicant: Symantec Corporation, Mountain View, CA (US)

(72) Inventor: Daniel Kowalyshyn, Yorba Linda, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/937,401

(22) Filed: Mar. 27, 2018

(51) Int. Cl.
| | |
|---|---|
| *H04M 1/66* | (2006.01) |
| *H04W 12/08* | (2009.01) |
| *H04W 12/06* | (2009.01) |
| *H04W 4/02* | (2018.01) |

(52) U.S. Cl.
CPC ............ *H04W 12/08* (2013.01); *H04W 4/023* (2013.01); *H04W 12/06* (2013.01)

(58) Field of Classification Search
CPC .............. H04M 1/2745; H04M 1/677; H04M 1/72519; H04M 15/00; H04M 15/76; H04M 2215/7245; H04W 4/24; H04W 88/02
USPC ........... 455/410–411, 412.2–414.1, 415, 466
See application file for complete search history.

(56) References Cited

U.S. PATENT DOCUMENTS

| | | | | |
|---|---|---|---|---|
| 6,542,729 | B1 * | 4/2003 | Chmaytelli | H04M 3/2218 379/114.14 |
| 8,640,207 | B2 * | 1/2014 | Zubas | H04L 63/102 726/4 |
| 9,668,140 | B2 * | 5/2017 | Enright | H04W 12/12 |
| 2002/0045457 | A1 * | 4/2002 | Taniguchi | H04M 1/2745 455/463 |
| 2002/0178740 | A1 * | 12/2002 | Sumida | F24F 11/30 62/157 |
| 2006/0025110 | A1 * | 2/2006 | Liu | H04M 1/673 455/411 |
| 2007/0136792 | A1 * | 6/2007 | Ting | G06F 21/32 726/5 |
| 2008/0126145 | A1 * | 5/2008 | Rackley, III | G06Q 20/102 455/406 |
| 2008/0220814 | A1 * | 9/2008 | Hedtke | H04M 1/0214 455/556.1 |
| 2009/0227232 | A1 * | 9/2009 | Matas | H04M 1/665 455/411 |
| 2009/0233579 | A1 * | 9/2009 | Castell | G06Q 20/105 455/411 |
| 2009/0276475 | A1 * | 11/2009 | Ramsey | H04L 63/083 |
| 2011/0159844 | A1 * | 6/2011 | Gillet | H04M 1/673 455/411 |

(Continued)

*Primary Examiner* — Dai Phuong
(74) *Attorney, Agent, or Firm* — Patent Law Works LLP

(57) ABSTRACT

A predetermined event occurring on a client device is detected. The predetermined event can be in the form of a user-initiated action, an audio command, geolocation information, a breaking of a wireless connection, or exceeding a relative distance. The detection of the predetermined event triggers a switch of the current access mode of the client device to a more secure access mode. Access mode switches on other client devices may also be triggered. Additional actions may be executed on the client device and the other associated client devices to further secure these devices.

20 Claims, 4 Drawing Sheets

(56) References Cited

U.S. PATENT DOCUMENTS

| | | | |
|---|---|---|---|
| 2012/0149350 A1* | 6/2012 | Fan | H04M 3/02 |
| | | | 455/418 |
| 2013/0216108 A1* | 8/2013 | Hwang | G06K 9/00926 |
| | | | 382/118 |
| 2015/0133085 A1* | 5/2015 | Mun | G06F 21/305 |
| | | | 455/411 |
| 2015/0207917 A1* | 7/2015 | Yang | H04W 12/00 |
| | | | 455/411 |
| 2016/0174025 A1* | 6/2016 | Chaudhri | H04W 4/02 |
| | | | 455/41.1 |
| 2016/0292404 A1* | 10/2016 | Tseng | G06F 21/6245 |
| 2017/0238138 A1* | 8/2017 | Aminzade | H04L 41/0816 |
| | | | 726/19 |

\* cited by examiner

AUTOMATICALLY SWITCHING TO A BARRICADE MODE TO SECURE MOBILE COMPUTING DEVICES IN RESPONSE TO PREDETERMINED MOBILE COMPUTING DEVICE EVENTS

TECHNICAL FIELD

This disclosure pertains generally to computing device security, and more specifically to automatically switching an access mode of a computing device from a current access mode to a more secure access mode in response to certain predetermined computing device events.

BACKGROUND

With the increasing capacity and storage of smartphones, tablets, or other mobile computing devices, more and more confidential data files and documents are now being processed and/or stored on mobile computing devices. While this brings convenience to users with easier and quicker access to their data, this may raise security concerns in certain circumstances, especially when a user loses physical possesion or control of his/her mobile computing device.

To address security concerns, mobile computing devices nowadays are equipped with certain high-security access modes, such as eight digit pin, password, or multi-factor authentication mode. However, these high-security access modes are generally more complicated and less convenient than the low-security access modes, such as four digit pin or fingerprint scan, and thus generally are less popular, especially for frequently used mobile computing devices such as smartphones. For instance, four digit pin access mode and biometric scanning mode are generally more convenient and thus are more widely used among smartphone owners.

It would be desirable to address these issues.

SUMMARY

A predetermined event may trigger a mobile computing device to automatically switch to a barricade mode to secure data files and documents on the client device. More specifically, a mobile computing device may detect one or more predetermined mobile computing device events. A predetermined mobile computing device event can be in the form of a geolocation-related event, a user-initiated action detected through a sensing-based mechanism, an audio command detected through a sensing-based mechanism, a breaking of a wireless connection between the mobile computing device and an external computing device, a physical distance between the mobile computing device and an external computing device exceeding a predetermined threshold, etc. The user-initiated action may be a device shake, a compass spin, a biometric scanning from a predetermined finger, a touch of a screen panic button, or a touch of an app panic button.

Responsive to detecting a predetermined mobile computing device event, the mobile computing device may be automatically switched to a barricade mode to increase its security. This may include automatically changing an access mode of the mobile computing device from a current mode to a more secure mode. For instance, the mobile computing device may disable a biometric access mode and/or a four digit access pin mode, and enable an access mode that requires an entry of a password, and/or enable a multi-factor authentication mode. Additional actions that may be performed by the client device in the barricade mode may include shutting down the mobile computing device, locking the computing device, encrypting at least some content on the mobile computing device, and even factory resetting the mobile computing device. On a Mobile device management ("MDM") or data loss prevention ("DLP") enabled computing device, a barricade action may be to delete the local private key, which would instantly render the currently encrypted data unreadable.

In certain circumstances, a message concerning the automatic switching of the mobile computing device, and/or a message that includes contact information of a party to contact for information on accessing the mobile computing device, may be displayed on the mobile computing device to provide certain information regarding the mobile computing device that is in barricade mode.

In certain circumstances, the mobile computing device that is in barricade mode may additionally send a signal to at least one other computing device in response to detecting the predetermined mobile computing device event. The other mobile computing device may similarly switch to a barricade mode to increase its security.

In certain circumstances, the mobile computing device in barricade mode may send a signal to a backend server in response to detecting the predetermined mobile computing device event. The backend server may provide instructions to at least one additional mobile computing device to automatically switch a current access mode to a more secure access mode to improve the security of the additional mobile computing device(s).

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
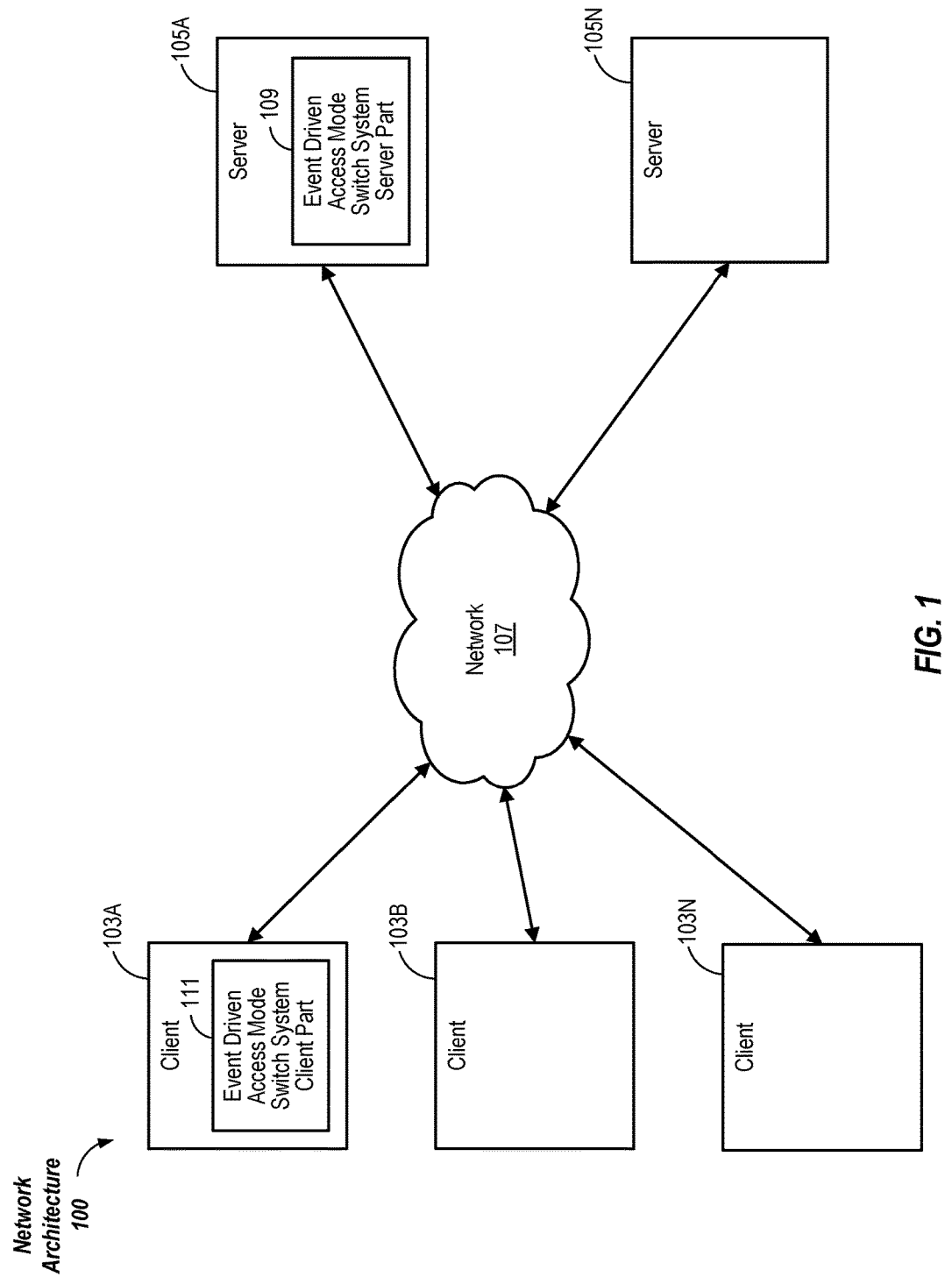
FIG. 1 is a block diagram of an exemplary network architecture in which an event driven access mode switch system can be implemented, according to some embodiments.

FIG. 1 is a block diagram illustrating an exemplary network architecture 100 in which an event driven access mode switch system 101 can be implemented. In the illustrated network architecture 100, client systems 103A, 103B, and 103N, as well as servers 105A and 105N, are communicatively coupled to a network 107. In FIG. 1, an event driven access mode switch system server part 109 is illustrated as residing on server 105A, with an event access mode switch system client part 111 residing on each client 103A-103N. In other embodiments, the event driven access mode switch system 101 can be distributed between multiple computers 210 in other ways as desired. In FIG. 1, servers 105A and 105N are connected to client systems 103A-N via network 107.

Many different networking technologies can be used to provide connectivity from each of client computer systems 103A-N to network 107. Some examples include: LAN, WAN (e.g., the internet), cellular network, and various wireless technologies. Client systems 103A-N are able to access applications and/or data on server 105A or 105N using, for example, the event driven access mode switch system client part 111, or a web browser or other client software (not shown). This enables client systems 103A-N to run and otherwise interact with applications from an application server 105 and/or to access data hosted by a storage server 105 or other devices connected to the server 105 through wireless or wired connections. Clients 103 can be in the form of, for example, mobile computing devices comprising portable computer systems capable of connecting to a network 107 and running applications, or desktop computers. Some examples of mobile computing devices are smartphones, tablet computers, laptop computers, hybrids, convertible laptops, smart watches, smart bracelets, and other types of wearable computing devices.

The servers 105A-N (also referred to individually and collectively as 105) may include one or computing components having data processing, storing, and communication capacities. For example, a server 105 may include one or more hardware servers, server arrays, storage devices and/or system, etc. In some embodiments, the servers 105A-N may include one or more virtual servers.

Although FIG. 1 shows an event driven access mode switch system server part 109 as being separated from an event driven access mode switch system client part 111, the figure is intended more for illustration purpose. In practice, an event driven access mode switch system server part 109 may be integrated with an event driven access mode switch system client part 111. For instance, an event driven access mode switch system server part 109 may integrate with an event driven access mode switch system client part 111 to form an integrated event driven access mode switch system 101 in a client device 103A.

Although FIG. 1 illustrates three clients 103A-N and two servers 105A-N as an example, in practice many more (or fewer) computers can be deployed. In some example embodiments, the network 107 is in the form of a wireless LAN, a cellular network, or the internet. Other networks 107 or network-based environments can be used in other embodiments.

Figure 2:
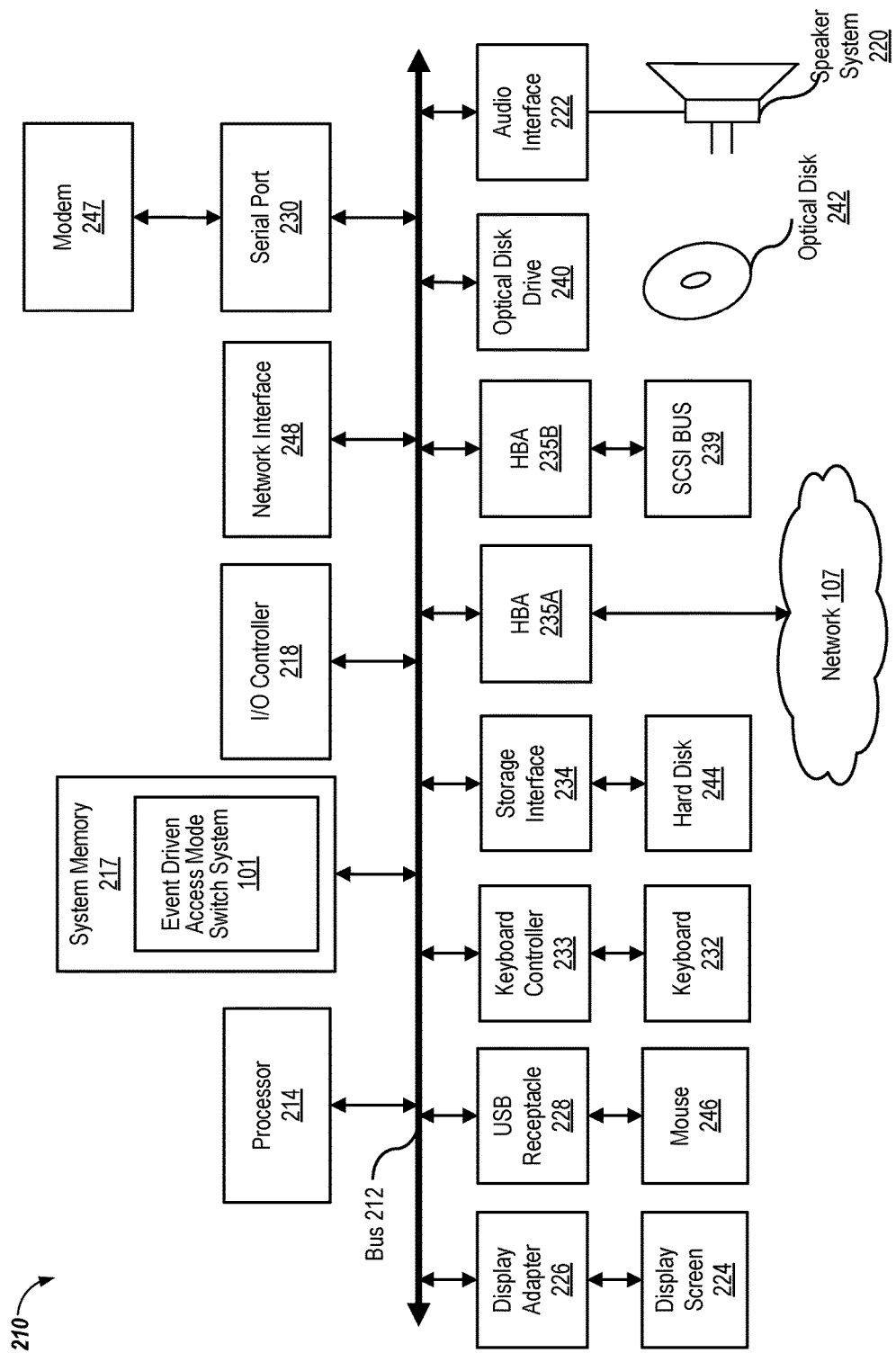
FIG. 2 is a block diagram of a computer system suitable for implementing an event driven access mode switch system, according to some embodiments.

FIG. 2 is a block diagram of a computer system 210 suitable for implementing an event driven access mode switch system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments, the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the event driven access mode switch system 101 is illustrated as residing in system memory 217. The workings of the event driven access mode switch system 101 are explained in greater detail below in conjunction with FIG. 3.

The storage interface 234 is coupled to one or more hard disks 244 (and/or other standard storage media). The hard disk(s) 244 may be a part of computer system 210 or may be physically separate and accessed through other interface systems.

The network interface 248 and/or modem 247 can be directly or indirectly communicatively coupled to a network 107 such as the internet. Such coupling can be wired or wireless.

Figure 3:
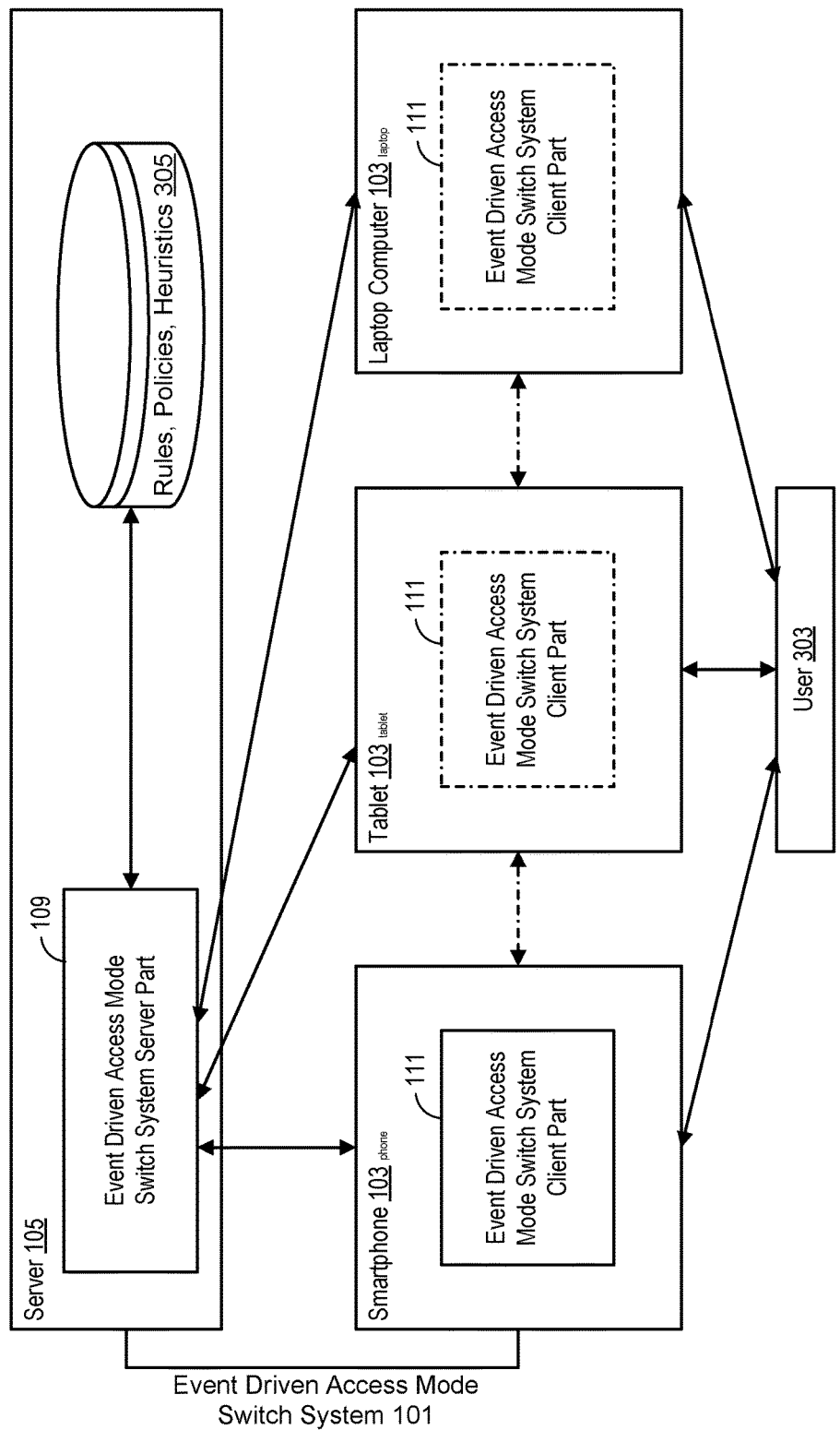
FIG. 3 is a block diagram of the operation of an event driven access mode switch system, according to some embodiments.
Figure 4:
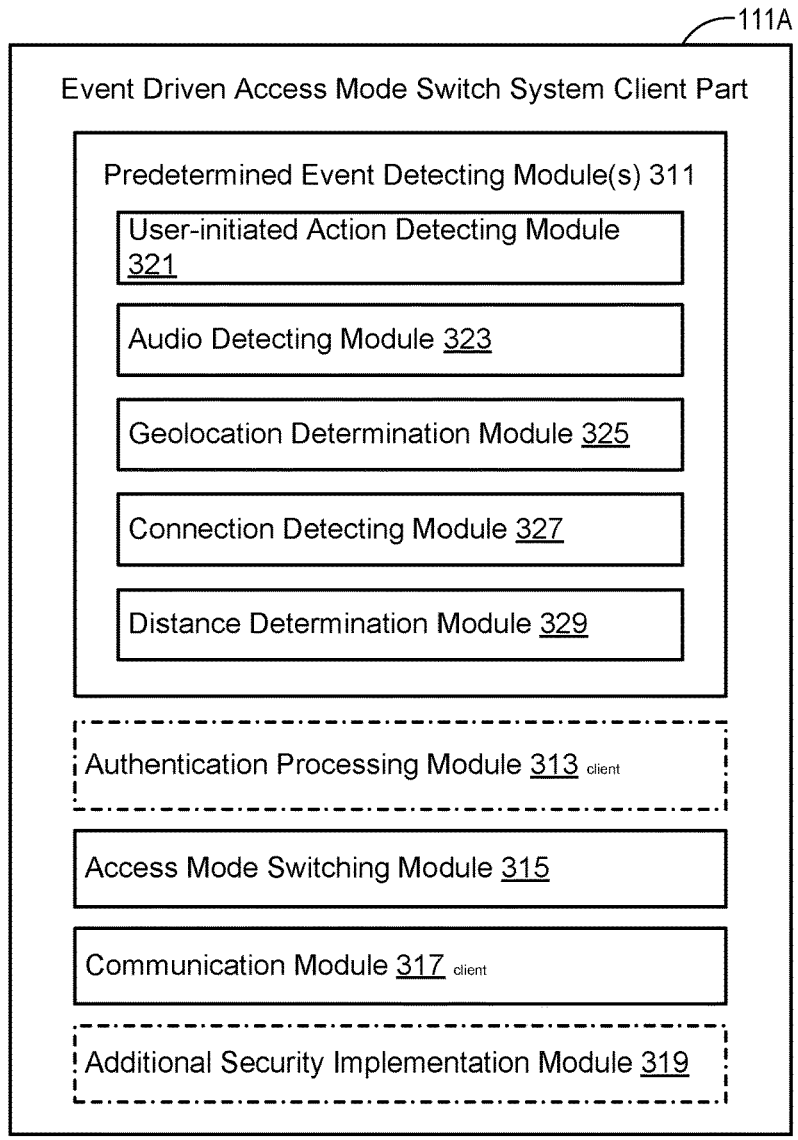
FIG. 4 is a block diagram of specific modules of an event driven access mode switch system client part, according to some embodiments.
Figure 5:
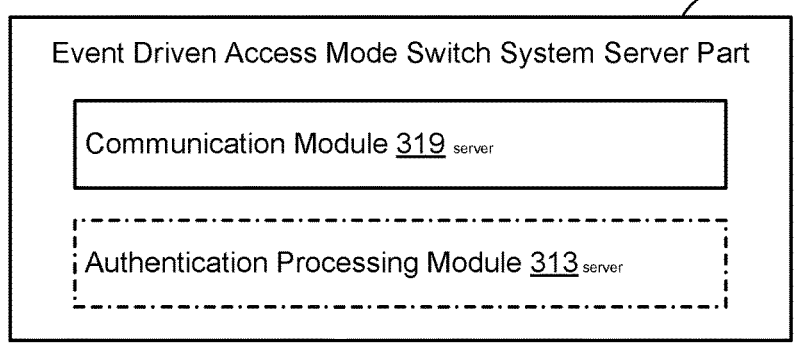
FIG. 5 is a block diagram of specific modules of an event driven access mode switch system server part, according to some embodiments.

FIG. 3 illustrates the operation of an event driven access mode switch system 101, according to some embodiments. As described above, the functionalities of the event driven access mode switch system 101 can reside on a client 103, a server 105, or be distributed between multiple computer systems 210, including within a cloud-based computing environment in which certain functionalities of the event driven access mode switch system 101 are provided as a service over a network 107. It is to be understood that although the event driven access mode switch system 101 is illustrated in FIG. 3 as an entity with a server part 109 and multiple client parts 111, the illustrated event driven access mode switch system 101 represents a collection of functionalities, which can be instantiated as a single or multiple modules as desired (instantiations of specific, multiple module event driven access mode switch systems 101 are illustrated in FIGS. 3-5). It is to be understood that the modules of the event driven access mode switch system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the event driven access mode switch system 101 can be stored on computer-readable storage media. Any form of tangible computer readable storage medium can be used in this context, such as magnetic, optical or flash storage media. As used herein, the term "computer readable storage medium" does not mean an electrical signal separate from an underlying physical medium.

As illustrated in FIG. 3, the event driven access mode switch system 101 can detect events on mobile computing devices 103 and automatically switch the devices 103 into barricade mode, by switching their current access to a more secure setting. As illustrated in FIG. 3, in some embodiments, an event driven access mode switch system server part 109 performs the server-side operations of the event-driven access mode switching. Specific modules of the server part 109 of the event driven access mode switch system 101 according to one embodiment are illustrated in FIG. 5.

The server 105 is connected to multiple client devices 103 via one or more networks 107, which can be in the form of the internet, a cellular network, an enterprise level wide area network, a local area network at a small business, a home level wireless network, etc. An event driven access mode switch system client part 111 runs on each client device 103, which performs the client side operations of the event driven access code switching. For clarity of illustration and explanation, FIG. 3 depicts three separate client devices 103 each of which is associated with a single user 303: a smartphone $103_{phone}$, a tablet $103_{tablet}$, and a laptop $103_{laptop}$. It is to be understood that in practice, more or fewer client devices 303 can be associated with a single user 303. It also to be understood that client devices 103 of many more users can interact with an event driven access mode switch system 101. Specific modules of the event driven access mode switch system client part 111 according to one embodiment are illustrated in FIG. 4.

As the word "enterprise" is used herein, the term encompasses not only corporations and other business organizations, but public sector and non-commercial organizations as well. Corporations, governments, universities and not-for-profit organizations are all examples of enterprises. Thus, as used herein an "enterprise network" 107 means a network 107 maintained by any type of organization (e.g., a corporation, a university, a government department, a municipality, a civic organization, etc.). Typically an enterprise stores proprietary or other private data on its network 107, and access to the network 107 is restricted according to policies set by an administrator.

The event driven access mode switch system 101 greatly improves the security profile of client devices 103 by proactively or reactively switching authentication modes and barricading client devices 103. More specifically, the event driven access mode switch system 101 enables a user 303 to proactively perform certain events to trigger a barricade alert, which then causes certain automatic actions to secure some or all of the user's client devices 103, as well as possible devices 103 of other users, as described in more detail as follows. Additionally or alternatively, the event driven access mode switch system 101 also enables a client device 103 to reactively respond to certain predetermined events that trigger a barricade alert.

The event driven access mode switch system client part 111A on a client device 103A may include one or more predetermined event detecting modules 311 for detecting a variety of predetermined events that trigger a barricade alert. In the embodiment illustrated in FIG. 4, the event driven access mode switch system client part 111 includes a user-initiated action detecting module 321, an audio detecting module 323, a geolocation determination module 325, a connection detecting module 327, and a distance determination module 329, as well as other modules discussed in more detail below. To allow these different modules to work, the client device 103 may include a variety of sensors or transceivers that enable the detections of different predetermined client device events.

The user-initiated action detecting module 321 can detect one or more predetermined user-initiated actions that may trigger the generation of a barricade alert. These user-initiated actions can take various forms, such as a gesture, a user interface interaction, or a physical component interaction, etc. Some examples are a device shake, a compass spin, a biometric scanning of a predetermined finger which is not a normal finger generally used by an owner for biometric scanning for access authentication, a touch of a screen/app panic element (e.g., a user interface element such as a graphical button), or a press of a physical button or a combination of physical buttons predefined to be able to trigger a barricade alert, etc. The occurrence of one or more of these user-initiated actions is automatically detected by the user-initiated action detecting module 321. A notification of such detection and/or a barricade alert may be then generated as described in more detail below.

In one example scenario, during a routine traffic stop, a police officer asks a driver to turn over his/her smartphone for review. Realizing that he is not under arrest and this is likely an illegal search of the phone, the driver may proactively conduct a predetermined user-initiated action before handing over the phone (e.g., a biometric scanning of a predetermined finger which is not a normal finger, or a simple device shake, etc.) to trigger a barricade alert, which results in an automatic switch of his/her smartphone to a more secure access mode as further described below, to prevent exposing text messages, photos, contacts, or other private data to the police officer.

The audio detecting module 323 can detect one or more predetermined audio commands that may trigger a barricade alert. The audio commands can take a variety of forms or patterns. For instance, it may be a series of coughs, a whistle, an oral lockdown instruction, a recitation of a certain phrase or words, or any other audio command recognizable by the client devices 103. In some embodiments, the audio detecting module 323 may include its own default audio command recognition component(s) to recognize the predetermined audio commands. In certain embodiments, the audio detecting module 323 may utilize a third-party audio command recognition application installed on the client devices 103 (e.g., Google Assistance®) to detect the predetermined audio commands.

The inclusion of the audio detecting module 323 in the event driven access mode switch system 101 may advantageously allow a user to proactively initiate a predetermined event even without physically possessing the client device 103. For instance, in the above example scenario, even after handing over the phone to the police officer, the driver may still proactively generate a certain audio command (e.g., a whistle) to trigger a predetermined event that can be detected by the audio detecting module 323.

The geolocation determination module 325 can detect one or more predetermined client device events based on geolocation information of client devices 103. A geolocation of a client device 103 may be determined based on an embedded global positioning system (GPS), a connected cellular base station, an IP address, a wireless access point, or other certain approaches that assist with geolocation determination (e.g., WIFI or cellular triangulation). Based on the determined geolocation information, the geolocation determination module 325 may detect a predetermined client device event.

In one example scenario, during a government business trip, a traveler may expect a potential check of his/her smartphone, laptop, or other computing devices by a foreign airport customs inspector. Realizing that this may or may not be a legal search in this jurisdiction, the traveler may predefine one or more geolocation-based event(s) as a predetermined triggering event before his/her travel. For instance, the traveler may define being in any locations outside his/her home country as a predetermined client device event. Upon arrival at the foreign airport, the geolocation determination module 325 may automatically detect a geolocation-based predetermined event when a client device is powered on, without further user-initiated actions. Such predetermined geolocation events may be defined at any levels of granularity (e.g., specific locations such as border crossings, locations in specific countries, cities, neighborhoods, etc.).

The connection detecting module 327 can detect a breaking of a signal connection (e.g., a wireless connection) between one client device 103 with another client device, or between one client device with other devices (e.g., a wireless router). The signal used for connection detection may include certain short-range wireless communication signals, such as Bluetooth®, WIFI, Near-Field Communication (NFC), Infrared, A-Wave, ZigBee, etc. A breaking of such a signal connection (for instance, between a laptop and a wireless access point, between a tablet and a smartphone, etc.) may indicate a potential risk of a theft/loss/confiscation of a client device, which can be detected by the connection detecting module 327. For instance, a user 303 may set up signal connections between his/her multiple client devices 103 or between his/her computing devices and a wireless accessing point. A breaking of such signal connection may raise a concern that one of his/her client devices may be at risk. The connection detecting module 327 may detect breaking of such a signal connection and generate a barricade alert for the raised risk. Such signal connection events can be configured at any desired levels of granularity.

The distance determination module 329 can detect an exceeding of a relative distance between a client device 103 and a certain location. Exceeding a relative distance generally refers to exceeding a predetermined threshold of relative distance (i.e., the client device is no longer within the threshold distance relative to the certain location). The relative distance generally refers to a physical distance, while other relative distances (e.g., a relative IP distance) may also be considered. The certain locations used for determining the relative distance with the client device 103 can be configured at any level of granularity, for example, a residential location, an enterprise location, a lodging location, a recreation site, a stationary vehicle, or any other locations that can be set up or defined by the user 303. In some embodiments, the certain locations may also be dynamic and relate to a mobile component or device, such as a moving vehicle, a mobile home, a second mobile device, etc.

In some embodiments, the threshold of relative distance can be set differently for different conditions. For instance, for a residential location, the threshold of relative distance may be set as 5 miles, while for an enterprise location, the relative distance may be set as 500 feet. In certain embodiments, two or more relative distances can be set up for the same client device 103. For instance, the distance determination module 329 may simultaneously determine multiple relative distances to multiple locations (i.e., a residential location, an enterprise location, a vehicle location, etc.) for a single client device 103 (e.g., the user's phone $103_{phone}$), each with its own relative distance. Exceeding any one of these relative distances would trigger a barricade alert.

It is to be understood that while the predetermined event detecting module(s) 311 as illustrated includes the user-initiated action detecting module 321, the audio detecting module 323, the geolocation determination module 325, the connection detecting module 327, and the distance determination module 329, the predetermined event detecting module(s) 311 in a client device 103 are not limited to those modules for detecting predetermined events. Other modules may additionally be set up to detect or identify other predetermined client device events. It is also to be understood that a single, specific client device 103 may not necessarily include all of the illustrated predetermined event detecting modules 311. For instance, a client desktop computer may not include a user-initiated action detecting module 321 to detect a device shake, a compass spin, etc.

Upon a detection of a predetermined client device event, a barricade alert may be generated, which is provided to the authentication processing module 313 for next action(s). The generated barricade alert may be a notification, a signal, a call, etc., that can be recognized by the authentication processing module 313.

The authentication processing module 313 can determine what action to take based on certain rules, policies, and/or heuristics 305. In one embodiment, the authentication processing module 313 may just automatically switch a current access mode of the client device 103 on which the event occurred to a more secure access mode. For instance, the authentication processing module 313 may work with the access mode switching module 315 to automatically disable a current biometric access mode on the client device 103, and enable an access mode that requires an entry of a password. In another example, the authentication processing module 313 may disable a current four digit pin access mode, and enable an access mode that similarly requires an entry of a password or an eight digit pin. Other actions taken by the authentication processing module 313 may include enabling a multi-factor authentication mode on the client device, etc.

In some embodiments, beyond switching the current access mode to a more secure access mode, the event driven access mode switch system 101 may implement additional actions to provide further protection of the client devices at risk (including one or more associated client device(s) in some embodiments).

The additional security implementation module 319 may be included in the event driven access mode switch system client part 111 to execute these additional security measures to further protect the client devices 103. For instance, the additional security implementation module 319 may automatically generate and display a message on a display screen to indicate that the client device is currently in barricade mode. Additional information can also be displayed, such as instructions for complying with a legal search, or other advice, e.g., from the enterprise legal or IT department. The displayed message may additionally and/or alternatively include information for contacting a party for information on accessing the barricaded client device 103.

In certain embodiments, the additional security implementation module 319 may automatically disable less secure access modes for the client device 103, such as biometric scanning, four-pin access mode, etc.

In certain embodiments, the additional security implementation module 319 may implement client device lock down, device shutdown (fastmode or no fastmode), or even factory resetting of the client device 103. In certain embodiments, the additional security implementation module 319 may encrypt some or all data on the client device 103, for example with a one way cipher. On a Mobile device management ("MDM") or data loss prevention ("DLP") enabled computing device, a barricade action may be to delete the local private key, which would instantly render the currently encrypted data unreadable.

In some embodiments, the event driven access mode switch system 101 may provide protections not only to the client device 103 on which the predetermined event was detected (referred to here as a primary client device), but also to other secondary client devices (e.g., other client devices 103 of the same user 303, same household, same enterprise, etc.). Based on the detected event on the primary client device 103, it may be desirable to barricade or otherwise take protective action on one or more secondary client device(s) 103 as well. To protect the secondary client device(s), in some embodiments, the authentication processing module $313_{client}$ sends instructions directly to these secondary client devices to direct the secondary client devices to take necessary actions to prevent potential risk.

As illustrated in FIGS. 4 and 5, an authentication processing module 313 may be located at the event driven access mode switch system client part 111 and/or located at the event driven access mode switch system server part 109. In some embodiments, the server side authentication processing module $313_{server}$ can determine what actions to take for the primary client device 103 (for example, in an embodiment in which an authentication processing module $313_{client}$ does not exist on the primary client device 103). In certain embodiments, the server side authentication processing module $313_{server}$ may direct the secondary client device(s) to take security actions.

The event driven access module switch system 101 may utilize the client side communication module $317_{client}$ and the server side communication module $317_{server}$ for communications between the event driven access mode switch system client part 109 and the authentication processing module $313_{server}$. These communications may include transmitting the detected predetermined events, generated barricade alerts, and/or actions to take/taken by the primary client device 103 from the primary client authenticaiton processing module $113_{client}$ to the server side authentication processing module $313_{server}$, and/or sending instructions to one or more secondary client devices, and/or back to the primary client device 103 under certain circumstances.

In some embodiments, the instructions for the secondary client devices may comprise directions to take actions similar to those taken by the primary device, such as automatically switching current access modes of the secondary client devices to more secure access modes, as well as, in some instances, those additional actions that can be taken by the primary client device, as discussed in more detail above.

In some embodiments, directives to take different and/or additional actions may be provided to the primary client device 103 and to secondary client device(s) 103. The determination of what action to take for each client device may be based on the risk level of the data files and documents on each device, a type of detected predetermined event, a capacity of each device, etc. The specific actions to take for each device may be determined based on the rules, policies, and heuristics 305 included in the event driven access code switch system 101, which can be configured, for example, by an enterprise (or household) level administrator or manager or the like, and may be further defined or modified by users 303 of the primary client device and/or the secondary client devices, in some embodiments. The rules, policies, and heuristics 305 can be defined at any level of granularity, and can be configured to cause one or more client devices to automatically take desired security actions as described above in response to detection of proactively conducted or reactively detected predetermined client device events.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for automatically securing a mobile computing device, the method comprising:

detecting that a predetermined mobile computing device event has been predefined by a user of mobile computing device, wherein the predetermined mobile computing device event is a user-initiated action that is proactively performed by the same user of the mobile computing device to trigger a barricade alert;

detecting that the predetermined mobile computing device event has been performed by the same user; and responsive to detecting the predetermined mobile computing device event, automatically switching the mobile computing device into a barricade mode, wherein automatically switching the mobile computing device into the barricade mode further comprises automatically changing an access mode of the mobile computing device from a first, current access mode to a second, different access mode, the first access mode and the second access mode both providing authentication for the same user of the mobile computing device to access the mobile computing device in response to receiving proper user inputs, and the second access mode providing more secure authentication to access the mobile computing device than the first access mode.

2. The method of claim 1, wherein automatically changing the access mode of the mobile computing device further comprises:
disabling a biometric access mode on the mobile computing device; and
enabling an access mode on the mobile computing device that requires an entry of a password.

3. The method of claim 1, wherein automatically changing the access mode of the mobile computing device further comprises:
disabling a four digit pin access mode on the mobile computing device; and
enabling an access mode on the mobile computing device that requires an entry of a password.

4. The method of claim 1, wherein automatically changing the access mode of the mobile computing device further comprises:
locking the mobile computing device.

5. The method of claim 1, wherein automatically changing the access mode of the mobile computing device further comprises:
enabling a multi-factor authentication mode on the mobile computing device.

6. The method of claim 1, wherein automatically changing the access mode of the mobile computing device further comprises:
encrypting at least some content on the mobile computing device.

7. The method of claim 1, wherein automatically changing the authentication mode of the mobile computing device further comprises:
factory resetting the mobile computing device.

8. The method of claim 1, further comprising:
transmitting a signal to at least one other computing device in response to detecting the predetermined mobile computing device event, wherein the at least one other computing device automatically switches from a current access mode to a more secure access mode in response to the received signal.

9. The method of claim 1, further comprising:
transmitting a signal to a backend service in response to detecting the predetermined mobile computing device event, wherein the backend service directs at least one additional computing device to automatically switch from a current access mode to a more secure access mode, in response to receiving the transmitted signal.

10. The method of claim 1, further comprising:
displaying a message on the mobile computing device concerning the automatic switching of the mobile computing device into the barricade mode, in response to detecting the predetermined mobile computing device event.

11. The method of claim 1, further comprising:
displaying, on the mobile computing, contact information of a party to contact for information on accessing the mobile computing device.

12. The method of claim 1, wherein detecting the predetermined mobile computing device event further comprises:
detecting a geolocation-related event of the mobile computing device.

13. The method of claim 1, wherein detecting the predetermined mobile computing device event further comprises:
detecting a user-initiated action through a sensing-based mechanism in the mobile computing device.

14. The method of claim 13, wherein the user-initiated action is one of a device shake, a compass spin, a biometric scanning from a predetermined finger, a touch of a screen panic button, and a touch of an app panic button.

15. The method of claim 1, wherein detecting the predetermined mobile computing device event further comprises:
detecting an audio command through a sensing-based mechanism of the mobile computing device.

16. The method of claim 1, wherein detecting the predetermined mobile event further comprises:
detecting a breaking of a wireless connection between the mobile computing device and an external computing device.

17. The method of claim 1, wherein detecting the predetermined mobile event further comprises:
detecting that a physical distance between the mobile computing device and an external computing device exceeds a predetermined threshold.

18. At least one non-transitory computer readable storage medium for automatically securing a mobile computing device, the at least one non-transitory computer readable-storage medium storing computer executable instructions that, when loaded into computer memory and executed by at least one processor of a computing device, cause the computing device to perform the following steps:
detecting that a predetermined mobile computing device event has been predefined by a user of mobile computing device, wherein the predetermined mobile computing device event is a user-initiated action that is proactively performed by the same user of the mobile computing device to trigger a barricade alert;
detecting that the predetermined mobile computing device event has been performed by the same user; and
responsive to detecting the predetermined mobile computing device event, automatically switching the mobile computing device into a barricade mode,
wherein automatically switching the mobile computing device into the barricade mode further comprises automatically changing an access mode of the mobile computing device from a first, current access mode to a second, different access mode, the first access mode and the second access mode both providing authentication for the same user of the mobile computing device to access the mobile computing device in response to receiving proper user inputs, and the second access mode providing more secure authentication to access the mobile computing device than the first access mode.

19. The at least one non-transitory computer readable storage medium of claim 18, further storing instructions for:
transmitting a signal to at least one other computing device in response to detecting the predetermined mobile computing device event, wherein the at least one other computing device automatically switches from a current access mode to a more secure access mode in response to the received signal.

20. A computer system for automatically securing a mobile computing device, the computer system comprising:
at least one processor;
system memory;
a predetermined event detecting module residing in the system memory, programmed to detect that a predetermined mobile computing device event has been predefined by a user of mobile computing device, wherein the predetermined mobile computing device event is a user-initiated action that is proactively performed by the same user of the mobile computing device to trigger a barricade alert, and detect that the predetermined mobile computing device event has been performed by the same user; and an access mode switching module residing in the system memory programmed to automatically switch the mobile computing device into a barricade mode, wherein automatically switching the mobile computing device into the barricade mode further comprises automatically changing an access mode of the mobile computing device from a first, current access mode to a second, different access mode, the first access mode and the second access mode both providing authentication for the same user of the mobile computing device to access the mobile computing device in response to receiving proper user inputs, and the second access mode providing more secure authentication to access the mobile computing device than the first access mode.

* * * * *